(12) United States Patent
Caldeira et al.

(10) Patent No.: US 8,165,733 B2
(45) Date of Patent: Apr. 24, 2012

(54) STALL, BUFFETING, LOW SPEED AND HIGH ATTITUDE PROTECTION SYSTEM

(75) Inventors: Fabricio Reis Caldeira, Sao Jose dos Campos-SP (BR); Dagfinn Gangsaas, Mindens, NV (US); Alvaro Vito Polati de Souza, Sao Jose dos Campo-SP (BR); Eduardo da Saiva Martins, Sao Jose dos Campos-SP (BR); Marco Tulio Sguerra Vita, Sao Jose dos Campos-SP (BR); Jose Marcio Vieira Dias Filho, Sao Paulo-SP (BR); Marcos Vinicius Campos, Sao Jose dos Campos-SP (BR); Emerson Freitas, Sao Jose dos Campos-SP (BR)

(73) Assignee: Embraer S.A., São José dos Campos-SP (BR)

( * ) Notice: Subject to any disclaimer, the term of this patent is extended or adjusted under 35 U.S.C. 154(b) by 919 days.

(21) Appl. No.: 11/849,501

(22) Filed: Sep. 4, 2007

(65) Prior Publication Data

US 2009/0062973 A1    Mar. 5, 2009

(51) Int. Cl.
*G05D 1/06* (2006.01)
(52) U.S. Cl. .................................. 701/6; 701/4; 244/181
(58) Field of Classification Search .................. 701/3, 4, 701/5, 6, 7, 8; 244/175, 178, 179, 180, 181, 244/182, 184
See application file for complete search history.

(56) References Cited

U.S. PATENT DOCUMENTS

| 3,033,496 | A | | 9/1962 | Brands |
| 3,345,018 | A | | 10/1967 | Chanak et al. |
| 3,584,814 | A | * | 6/1971 | Murphy ........................ 244/178 |
| 4,849,900 | A | * | 7/1989 | Blight et al. ....................... 701/7 |
| 5,446,666 | A | * | 8/1995 | Bauer ................................ 701/4 |
| 5,596,499 | A | * | 1/1997 | Glusman et al. ................. 701/14 |
| 5,722,620 | A | * | 3/1998 | Najmabadi et al. ........... 244/181 |
| 6,062,513 | A | * | 5/2000 | Lambregts .................... 244/175 |
| 6,236,914 | B1 | * | 5/2001 | Kaloust .......................... 701/11 |
| 6,246,929 | B1 | * | 6/2001 | Kaloust ........................... 701/11 |
| 6,935,596 | B2 | * | 8/2005 | Walter .......................... 244/195 |
| 7,690,603 | B2 | * | 4/2010 | Peyrucain et al. ............. 244/183 |
| 7,742,846 | B2 | * | 6/2010 | Fanciullo et al. ................ 701/4 |
| 2002/0066829 | A1 | | 6/2002 | DeWitt et al. |
| 2004/0093130 | A1 | * | 5/2004 | Osder et al. ....................... 701/3 |

* cited by examiner

*Primary Examiner* — Helal A Algahaim
(74) *Attorney, Agent, or Firm* — Nixon & Vanderhye PC

(57) ABSTRACT

A flight control system moves elevators according to a pilot command summed with an automatic command. The flight control system monitors a set of flight parameters to determine if the flight vehicle is operating inside a permitted envelope. The flight controls system incorporates automatic protections thru the automatic elevator command if the flight vehicle is close to its envelope limits. The exemplary illustrative non-limiting implementation herein provides automatic protections in order to protect the flight vehicle from low speeds, high attitude, stalls and buffetings.

15 Claims, 5 Drawing Sheets

STALL, BUFFETING, LOW SPEED AND HIGH ATTITUDE PROTECTION SYSTEM

TECHNOLOGICAL FIELD

The technology herein relates to a flight control system for an aircraft. More particularly, the technology herein relates to methods and apparatus for providing multiple protections to an aircraft equipped with an inceptor for inputting pilot commands.

BACKGROUND AND SUMMARY

While man has mastered travel on land, sea and air, there still exists, in travel through or across any of the three, some risk of peril. Although trained drivers, captains and pilots may have worked for years to develop their skill, human error still happens. Further, in the presence of adverse conditions such as bad weather, slight errors or miscalculations may be exacerbated into highly dangerous ones.

As technology advances, computers play a much more active role in aiding vehicle maneuvering. Features such as traction control, braking and steering are often processed at least in part by a car computer chip, for example, and more sophisticated car computers can even detect adverse weather conditions and compensate to help keep a driver safe.

Similarly, the use of feedback control laws to augment the pitch command of an aircraft has been used since the latter half of $20^{th}$ Century. In terms of modern aircraft, digital control laws are used to implement control laws that use a reference command based on pitch rate, load factor or a combination of thereof. Airspeed in conjunction with a load factor may also be considered as a reference command. In some cases, all three variables are considered as reference command, that is, the load factor, pitch rate and airspeed are considered.

The exemplary illustrative non-limiting implementations provide further safety controls for aircraft. For example, the flight control law of one exemplary illustrative non-limiting implementation computes an augmentation command correction based on a set of flight parameters and on the sensed position of the pilot inceptor. The pilot inceptor may be any of a plurality of devices used in aeronautics industry to serve as an interface with a human pilot, e.g. columns, mini-columns, sticks, control yokes, side-sticks, etc. The augmentation command may be mixed with a direct mode pilot command, which may be sent straight to the pitch control surface actuator. The actuator controls a pitch control surface such as an elevator.

Just as driver operations may be altered by a computer chip in a car to prevent accidents on the road, the augmentation command may perform stability augmentation with some additional protection functions for an airplane, which are designed to avoid some undesirable events, such as: i) stall, ii) stall with icing, iii) buffeting, iv) horizontal stabilizer high load, v) low speed, vi) high pitch attitude, etc.

According to one exemplary illustrative non-limiting implementation, the control law computes a reference command ($\delta_{law}$) in degrees, which is based at least in part on the position of the pilot inceptor. This function is called command shaping, and the function may change during flight. This reference command may be used both in feed-forward and integral loops: the feed-forward command may be produced based at least in part on a gain multiplied by the reference command ($\delta_{law}$); the integral command may be based at least in part on the integral of the error difference between either angle of attack ($\alpha$), or pitch angle ($\theta$), and the reference command ($\delta_{law}$), multiplied by another gain. Thus, for example, the error may be $e=\delta_{law}-\alpha$ or $e=\delta_{law}-\theta$.

Further, in this exemplary illustrative non-limiting implementation, the feedback loop may also consider a state feedback based on a set of sensed flight parameters such as angle of attack ($\alpha$), pitch rate (q), pitch angle ($\theta$) and airspeed (u) which may be combined using a set of gains.

The integral, feedback and feed-forward command may be summed to compound the augmentation command, which drives the pitch control and trends to reduce the error e to zero in steady state due to integral feedback.

According to this exemplary implementation, the gains may be computed such that the command augmentation automatically pitches the airplane down when one or more undesirable conditions, such as the ones mentioned above, are detected.

According to a further exemplary illustrative non-limiting implementation, based at least in part on a set of flight parameters, a logic module may be at least partly responsible to define the engagement of a control law in a protection function, such as those mentioned, which may be made dynamically during the flight. In a given flight condition, depending on the protection function performed, the logic module may change the following in the control law: i) all the gains of the control law, ii) the command shaping function that defines the relation between pilot command and reference command $\delta_{law}$, and/or iii) switch selection between angle of attack ($\alpha$) or pitch angle ($\theta$) in the integral command. In this exemplary implementation, the shaping function defines a maximum commanded angle of attack or pitch angle, correspondent to a maximum inceptor position, depending on which of them are being fed back in a given instant. This way, it is possible to limit the aircraft envelope as desired, using the same law structure that serves as a variety of protections, in different flight phases.

To define all that, the logic module and command shaping uses a set of parameters, which comprises: height above ground ($h_{AGL}$), ice detection bit ($b_{Ice}$) and engine throttle lever position ($\delta_{TLA}$).

When the logic module is not engaged, this control law may not send any command; i.e., a null augmentation command may be sent.

Also, the gains may change depending on flight envelope parameters and configuration parameters, such as Mach number, altitude, flap position and landing gear position.

Thus, according to one exemplary illustrative non-limiting implementation, either angle of attack or pitch angle are considered as a reference command. Further, the angle of attack and/or pitch angle values are limited inside a permitted flight envelope by means of a command shaping, and gains are changed, adapting one or more protection functions.

In accordance with another exemplary illustrative non-limiting implementation the command shaping, the feedback and feed-forward gains and switches and the integral feedback from angle-of-attack ($\alpha$) to pitch angle ($\theta$) are changed.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Figure 1:
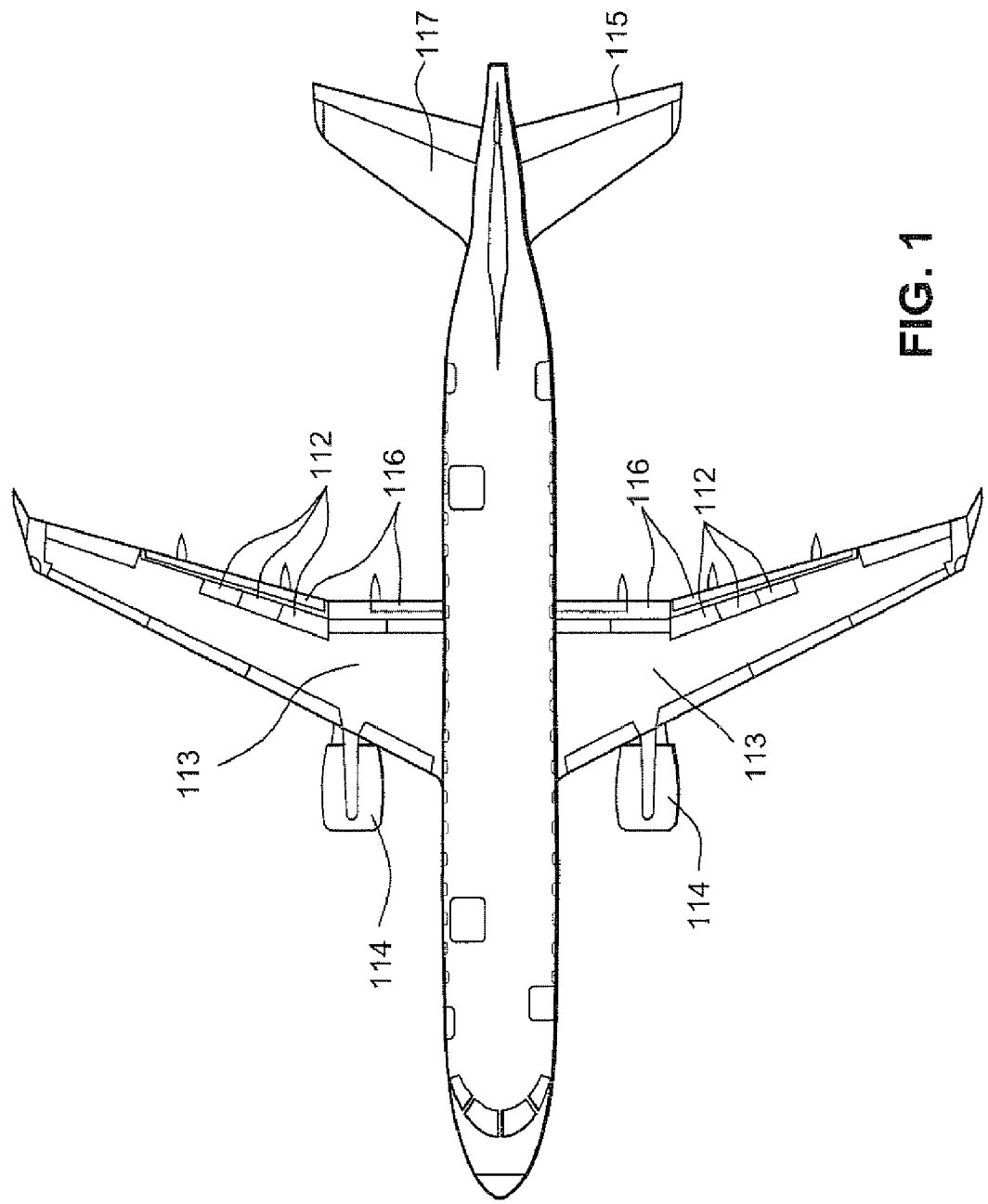
FIG. 1 is an example of one flight vehicle—a civil transporter turbo-fan.

The exemplary illustrative non-limiting implementations herein relate to systems, apparatuses and methods to be used in a flight vehicle equipped with pitch control, such as elevators and a pilot inceptor such as a side-stick or a column yoke. FIG. 1 shows an exemplary illustrative a twin turbo-fan engine 114 civilian transporter aircraft. The plane has a set of wings 113, provided with spoilers 112 and flaps 116. The spoilers 112 help change lift, drag and roll, and the flaps 116 help change lift and drag. The tail of the plane is also equipped with a horizontal stabilizer 117 provided with an elevator 115 which controls pitch orientation of the aircraft in flight.

Figure 2:
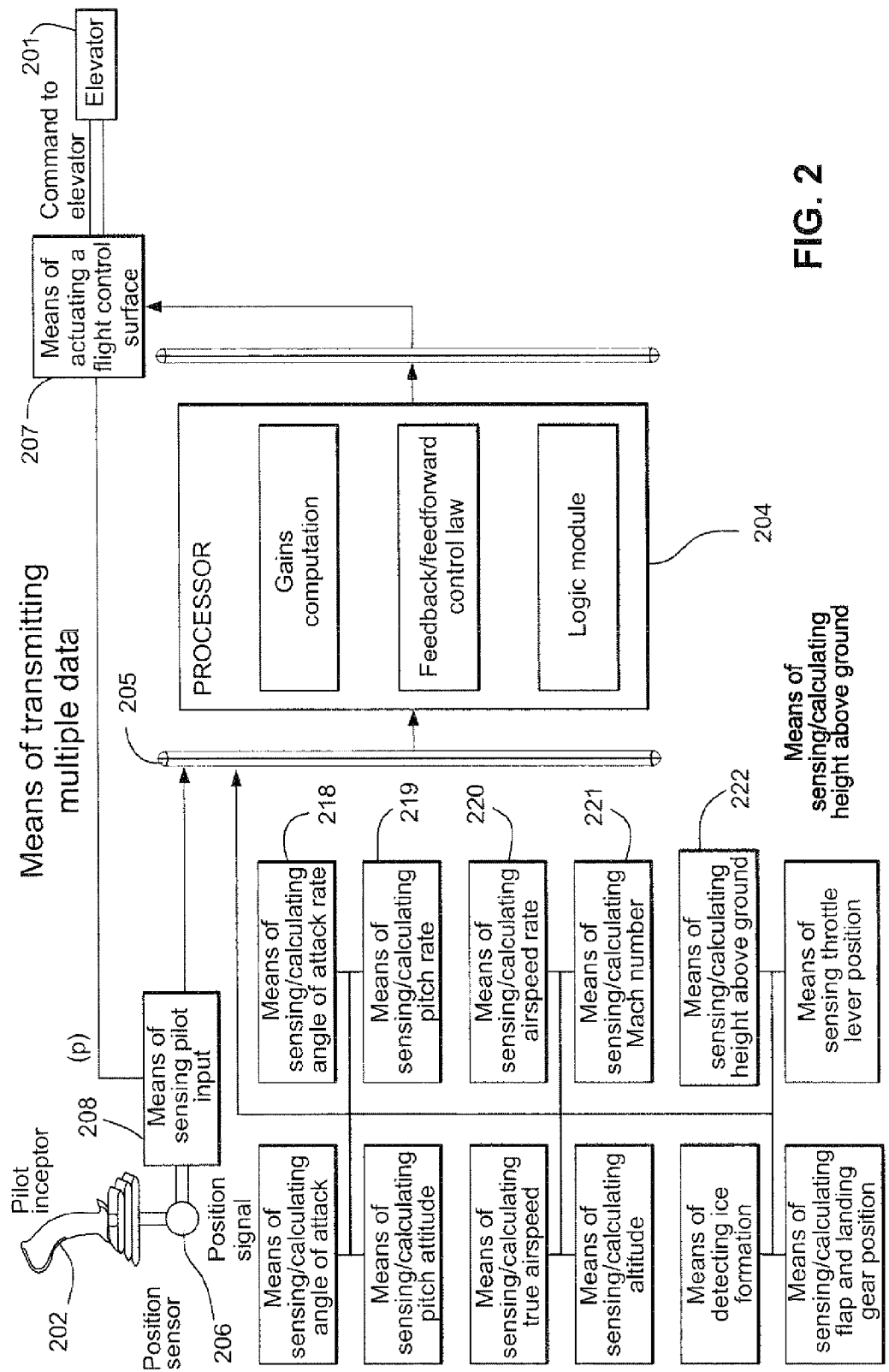
FIG. 2 is a schematic diagram of an exemplary illustrative non-limiting flight control system, showing the basic architecture of the system.

An exemplary illustrative non-limiting flight control system is shown in FIG. 2. This exemplary flight control system receives input position signals from the pilot inceptor 202 command (p). The term "pilot inceptor" includes a plurality of devices used in aeronautics industry to allow the interface with the human pilot, e.g. columns, mini-columns, sticks, side-sticks and all others.

Further, the exemplary illustrative non-limiting system receives signals from a set of sensors 218, 219, 220, 221, 222. In this exemplary implementation, the sensors provide: angle-of-attack ($\alpha$), angle-of-attack rate ($\dot{\alpha}$), airspeed (u), airspeed rate ($\dot{u}$), the flap position ($\delta_F$), gear position ($\delta_G$), pitch attitude ($\theta$), pitch rate (q), height above ground ($h_{AGL}$), ice detection bit ($b_{Ice}$), engine throttle lever position ($\delta_{TLA}$), Mach number (Mach) and altitude (h). Other sensors are also possible.

According to this exemplary implementation, the information flows via a means of transmitting multiple data such as a bus 205. All the data, i.e. pilot commands and sensors, is sent to a processor 204 that is operable to compute output based, for example, on a programmable code. The processor 204 is able, for example, to compute an elevator command based on the input data received. This command is sent to a mechanism to actuate a flight control surface 207, which comprises a control unit able to command the elevator surfaces 201 to the commanded position. Resultantly, the elevator surfaces are deployed according to the command computed by the processor 204.

Figure 3:
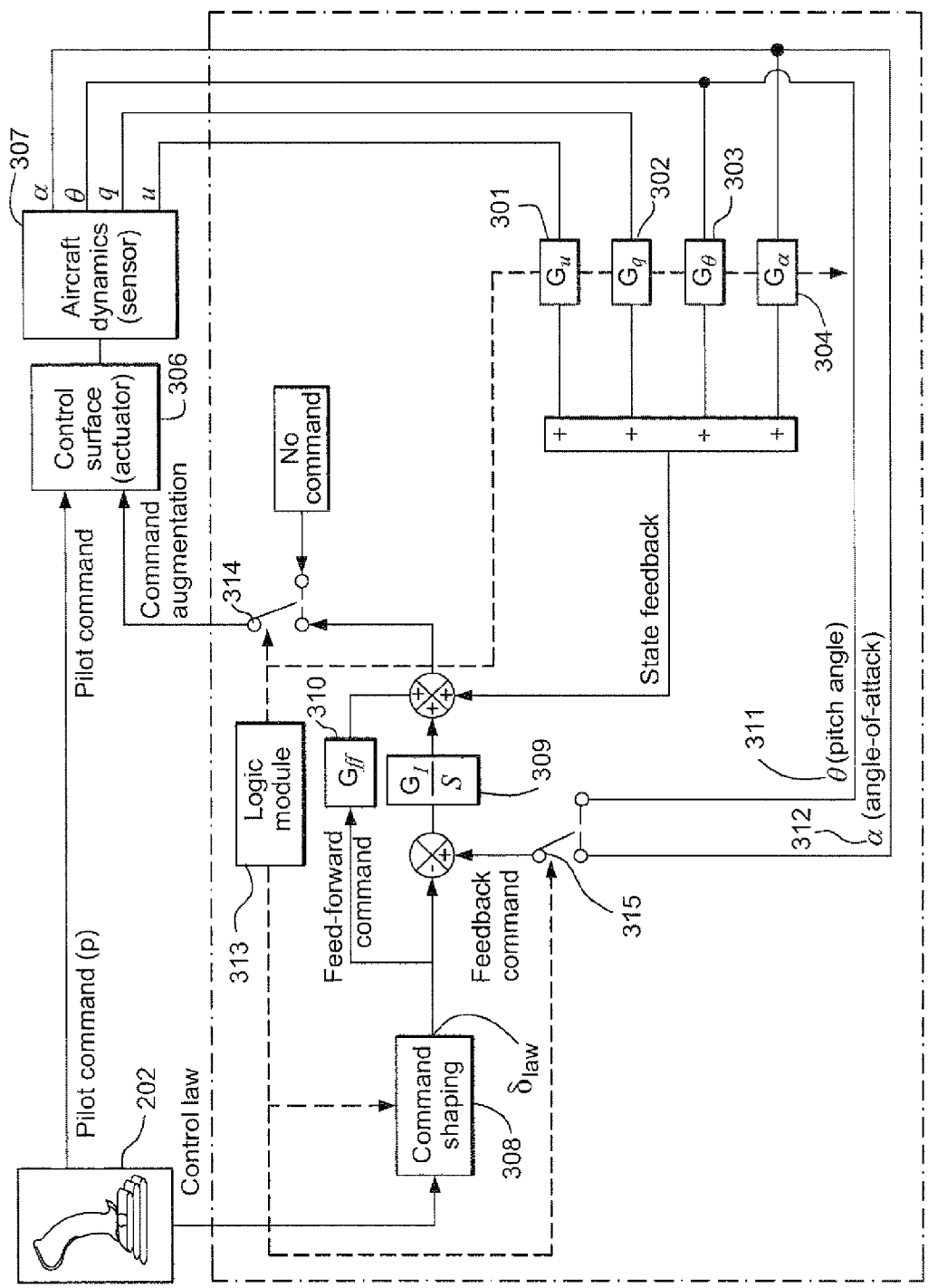
FIG. 3 presents a schematic of the exemplary illustrative non-limiting software that processes the function of the exemplary flight control system, showing how the pilot command is transformed into an elevator command depending on a logic module to enable it.

FIG. 3 shows exemplary main units of exemplary illustrative non-limiting software that may process the function in an exemplary flight controls system. The pilot command block 305 represents the position of the pilot inceptor which is sent directly to the elevator surface 306. According to this exemplary implementation, as long as the stall, buffeting, high attitude or low speed protections are active, this inceptor command is cancelled, i.e. the aircraft is completely controlled in the pitch axis through the full authority automatic system.

In the exemplary illustrative non-limiting implementation, pilot inceptor command is transformed into alpha ($\alpha$) command when the stall, buffeting and low speed protections are active or into pitch angle ($\theta$) command when high attitude protection is activated. The relation between the variable to be controlled ($\alpha$ or $\theta$) and pilot command is depicted as command shaping 308. The output of the command shaping ($\delta_{law}$) is used as reference to manipulate the elevators to track the variables $\alpha$ or $\theta$. When the pilot moves the inceptor to the stop (i.e. the mechanical limit of the inceptor), command shaping produces a maximum $\alpha$ or $\theta$ in order to preclude the airplane from exceeding the maximum allowed $\alpha$ or $\theta$ for the current airplane configuration.

The state feedback, feed-forward command and integral command compound the automatic elevator command. The state feedback signal is calculated using the pitch states of the aircraft dynamic 307 which are fed back to the closed loop control law. Airspeed (u), pitch rate (q), pitch angle ($\theta$) and angle of attack ($\alpha$) are multiplied by the gains listed as 301, 302, 303, 304, respectively. The feed-forward command is produced based on the feed-forward gain 309 multiplied by the reference generated by the command shaping output 308.

The error (e) is calculated as the result of the difference between the reference and the angle-of-attack or pitch angle. The angle-of-attack is used when the stall, low speed and/or buffeting protections are engaged. The pitch angle ($\theta$) is used when the high attitude protection is engaged. The integral of the error (e) is multiplied by the integral gain in order to produce the integral command.

The gains values depend upon which protection is active. For example, when the low speed protection is active, the pitch angle gain 303 and true airspeed gain 301 are increased when compared to the pitch angle gain 303 and true airspeed gain 301 used in the stall protection function. Also, the gains are scheduled according to the Mach number and altitude the airplane is flying at the moment the protection is engaged.

Figure 4:
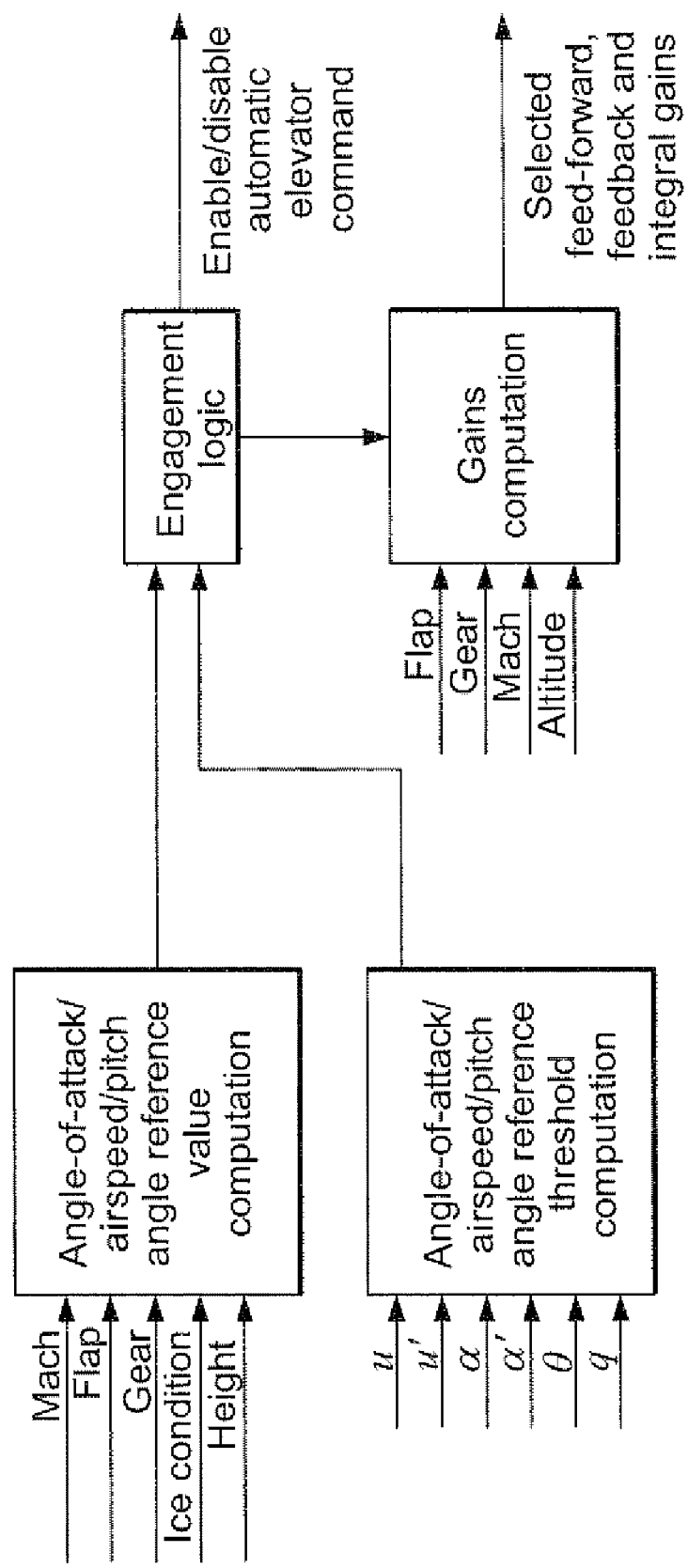
FIG. 4 is a diagram that details the exemplary illustrative non-limiting logic module, which enables the elevator command based on a series of sensor inputs.

FIG. 4 comprises all data processing according to one exemplary illustrative implementation to allow the proper engagement and gain switching of the exemplary flight control system mode, according to flight conditions.

The automatic elevator command may enabled when any of the conditions below is true:
1. The angle-of-attack plus a bias based at least in part on the angle-of-attack rate is above the angle-of-attack reference value.
2. The airspeed minus a bias based at least in part on the airspeed rate is below the airspeed reference value.
3. The pitch attitude plus a bias based at least in part on the pitch rate is above the pitch attitude reference value.

The angle-of-attack reference value depends at least in part upon the Mach number, landing gear, flap position and ice condition. The airspeed reference value depends at least in part upon the flap position. The pitch attitude reference value depends at least in part upon the flap position and height above ground level. The height above ground level is estimated based at least in part on ground speed and flight path angle for take-off and based on radar altimeter sensors for landing.

Figure 5:
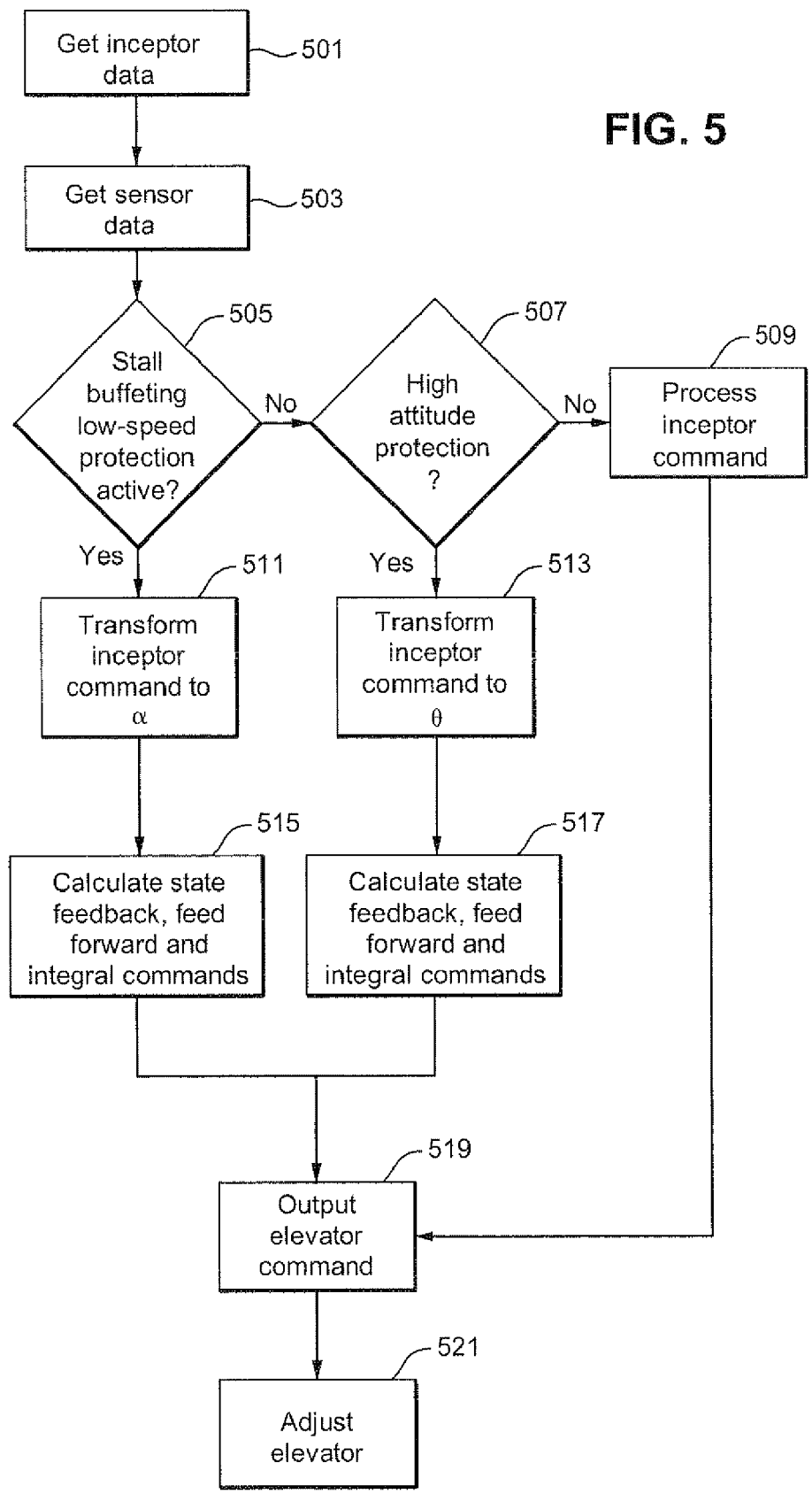
FIG. 5 is an exemplary logic flow of an exemplary routine according to one non-limiting implementation.

FIG. 5 shows an exemplary flow of an algorithm for determining processing of an inceptor command. Initially, the inceptor data is obtained (step 501). Along with the inceptor data, sensor data is obtained (step 503). The sensor data can be used to determine a variety of flight parameters, and can further be used to determine if any of the protections are active. Based on the sensor data, a system running the exemplary algorithm will determine if stall, buffeting or low speed protections are active (step 505). If any of those are active, then the inceptor command, in this exemplary implementation, is transformed into angle-of-attack reference a (step 511). If none of the mentioned protections are active, then the system determines if high attitude protection is active (step 507). If high attitude protection is active, then the inceptor command is transformed into pitch angle reference θ (step 513). If no protections are active, then the inceptor command is processed directly (step 509).

In the cases where protections are active, the system provides command shaping to transform the initial inceptor command into a control command for the elevator. To do so, the system calculates state feedback, feed-forward and/or integral commands and applies them through a transformation function to the respective reference values α or θ (steps 515, 517). Then, an elevator command is output to an actuator (step 519) and the actuator adjusts the elevator (step 521).

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. An aircraft control method for commanding at least one control surface based on a pilot command and an augmentation command, the method comprising:

computing, with at least one processor, a control law reference command $\delta_{law}$, wherein the control law reference command $\delta_{law}$ is a function of a position of a pilot inceptor, wherein $\delta_i$ is a measurement of a pilot inceptor position sensor that senses the position of the pilot inceptor;

computing, with the at least one processor, a feed-forward command $\Delta_{FF}$, wherein the feed-forward command $\Delta_{FF}$ is proportional to the control law reference command $\delta_{law}$, such that the feed-forward command comprises $\Delta_{FF} = G_{FF}\delta_{law}$, wherein $G_{FF}$ is a gain;

computing, with the at least one processor, an integral feedback command $\Delta_I$, wherein the integral feedback command $\Delta_I$ is a gain $G_I$ multiplied by an integral of an error e, wherein under at least a first condition error $e = \delta_{law} - \alpha$, wherein α is an angle of attack measured by an angle of attack sensor, and $\delta_{law}$ is the control law reference command, such that, $$\Delta_I(t) = G_I \int_0^t e(\tau)d\tau,$$

wherein t is time, and wherein under at least a second condition the error is $e = \delta_{law} - \theta$, where θ is a pitch angle measured by an inertial sensor, and $\delta_{law}$ is the control law reference command; and commanding the at least one control surface based on the pilot command and the augmentation command Δ, wherein the augmentation command Δ is a summation which comprises the feed-forward command ($\Delta_{FF}$), the integral feedback command ($\Delta_I$) and a state feedback command ($\Delta_{SF}$).

2. The method of claim 1, wherein said at least one first condition includes engagement of a stall protection, buffeting protection and/or low speed protection; and wherein said at least one second condition includes engagement of a high attitude protection.

3. The method of claim 1, further including:

changing said error during a flight, from $e = \delta_{law} - \alpha$ to $e = \delta_{law} - \theta$, and vice versa; as a function that depends on flight parameters comprising height above ground level ($h_{AGL}$), the pitch angle (θ), the angle-of-attack (α), a flight path angle (γ), and a ground speed ($u_G$).

4. The method of claim 3, further including:

computing the state feedback $\Delta_{SF}$ command, wherein $\Delta_{SF}$ is a summation of a set of flight parameters, measured from a plurality of sensors, and wherein the set of flight parameters are multiplied by a set of gains.

5. The method of claim 4, wherein the set of flight parameters comprise the angle of attack (α), a pitch rate (q), the pitch angle (θ) and an airspeed (u), and the set of gains comprise $G_\alpha$, $G_q$, $G_\theta$ and $G_u$, such that $\Delta_{SF} = G_\alpha\alpha + G_q q + G_\theta\theta + G_u u$.

6. The method of claim 4, wherein the parameters comprise the angle of attack (α), an angle of attack rate ($\dot\alpha$), the pitch angle (θ) and an airspeed (u), and the set of gains comprise $G_\alpha$, $G$, $G_\theta$ and $G_u$, such that $\Delta_{SF} = G_\alpha\alpha + G\dot\alpha + G_\theta\theta + G_u u$.

7. The method of claim 1, further including:

determining if a sensed angle-of-attack α plus a bias b is larger than an angle-of-attack reference value ($\alpha_R$), wherein said augmentation command (Δ) is enabled if the sensed angle-of-attack plus the bias is larger than the angle-of-attack reference value.

8. The method of claim 7, wherein said bias b is at least dependent on an angle-of-attack rate $\dot\alpha$.

9. The method of claim 7, wherein said angle-of-attack reference value $\alpha_R$ is a function that includes a Mach number (M), a landing gear position ($\delta_{GEAR}$), a flap position ($\delta_{FLAP}$) and an ice detection condition ($b_{ICE}$).

10. The method of claim 1, further including:

determining if a sensed airspeed u minus a bias b is lower than an airspeed reference value ($u_R$), i.e., $u - b < u_R$, wherein said augmentation command (Δ) is enabled if the sensed airspeed minus the bias is lower than an airspeed reference value.

11. The method of claim 10, wherein said bias b is at least dependent on an airspeed rate $\dot u$.

12. The method of claim 11, wherein said airspeed reference value $u_R$ is a function of a flap position ($\delta_{FLAP}$).

13. The method of claim 1, further including:

determining if the sensed pitch angle θ plus the bias b is larger than a pitch angle reference value ($\theta_R$), wherein said augmentation command (Δ) is enabled if the sensed pitch angle plus the bias is larger than the pitch angle reference value ($\theta_R$).

14. The method of claim 13, wherein said bias b is at least dependent on pitch rate q.

15. The method of claim 13, wherein said pitch reference value $\theta_R$ is a function which includes a flap position ($\delta_{FLAP}$) and the height above ground level ($h_{AGL}$).

* * * * *